(12) United States Patent
Sutardja et al.

(10) Patent No.: US 7,827,474 B1
(45) Date of Patent: *Nov. 2, 2010

(54) MARKING UNRELIABLE SYMBOLS IN A HARD DISK DRIVE READ BACK SIGNAL

(75) Inventors: Pantas Sutardja, Los Gatos, CA (US); Zining Wu, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 81 days.

This patent is subject to a terminal disclaimer.

(21) Appl. No.: 12/364,577

(22) Filed: Feb. 3, 2009

Related U.S. Application Data

(63) Continuation of application No. 11/821,937, filed on Jun. 26, 2007, now Pat. No. 7,490,285, which is a continuation of application No. 10/672,086, filed on Sep. 26, 2003, now Pat. No. 7,237,178.

(60) Provisional application No. 60/445,291, filed on Feb. 4, 2003.

(51) Int. Cl.
G06F 11/00 (2006.01)
H03M 13/00 (2006.01)

(52) U.S. Cl. .................................................. 714/799
(58) Field of Classification Search .............. 714/770, 714/799; 360/48, 35
See application file for complete search history.

(56) References Cited

U.S. PATENT DOCUMENTS

| 5,359,610 | A | * | 10/1994 | Weng .......................... 714/761 |
| 5,948,116 | A |   | 9/1999  | Aslanidis et al. |
| 6,192,499 | B1 |  | 2/2001  | Yang |
| 6,317,850 | B1 |  | 11/2001 | Rothberg |
| 6,381,725 | B1 |  | 4/2002  | Isokawa |
| 6,604,220 | B1 |  | 8/2003  | Lee |
| 6,798,593 | B2 | * | 9/2004 | Hattori et al. ................. 360/53 |
| 6,961,197 | B1 |  | 11/2005 | Burd et al. |
| 7,237,178 | B1 |  | 6/2007  | Sutardja et al. |

OTHER PUBLICATIONS

U.S. Appl. No. 60/344,407, filed Dec. 28, 2001, Burd et al.
U.S. Appl. No. 60/352,756, filed Jan. 28, 2002, Burd et al.

* cited by examiner

*Primary Examiner*—Shelly A Chase

(57) ABSTRACT

A system for detecting errors in a channel includes a signal detector to detect a first sequence from the channel, the first sequence comprising a plurality of symbols. A decoder determines a total number of symbols in error in the first sequence. A decoder asserts a failure indication when the total number of symbols in error in the first sequence is greater than a predetermined threshold. A controller causes the signal detector to detect a second sequence from the channel in response to the decoder asserting the failure indication. The decoder identifies corresponding symbols in the first sequence and the second detected sequence that differ.

16 Claims, 3 Drawing Sheets

MARKING UNRELIABLE SYMBOLS IN A HARD DISK DRIVE READ BACK SIGNAL

CROSS-REFERENCE TO RELATED APPLICATIONS

This application is a continuation of U.S. patent application Ser. No. 11/821,937 filed on Jun. 26, 2007, which is a continuation of U.S. patent application Ser. No. 10/672,086, filed Sep. 26, 2003 (now U.S. Pat. No. 7,237,178), which application claims the benefit of U.S. Provisional Patent Application No. 60/445,291, filed Feb. 4, 2003. The disclosures of the above applications are incorporated herein by reference.

BACKGROUND

The present invention relates to detection of signals on communications channels. More particularly, the present invention relates to marking unreliable symbols read back from a hard disk drive.

Data stored on magnetic media, such as hard disk drives, are typically encoded using an error-correction code, such as a Reed-Solomon code, so that errors that occur during storage and read back of the data can be detected and corrected. In conventional systems, the read back signal is typically detected by a channel detector, such as a Viterbi detector, that generates multi-bit symbols based on the read back signal. These symbols often include errors due to imperfect detection and noise.

Conventional systems typically include an error-correction decoder, such as a Reed-Solomon decoder, that uses the error-correction code in the data to correct these errors. Each error-correction code, and its associated decoder, has a power t, and can correct t symbol errors in the read back data sequence. When a sequence has more than t symbol errors, the decoder cannot correct the symbol, and typically triggers a retry, in which the data is read back from the disk a second time, detected again, and decoded again. This process can repeat until the detected sequence has t or fewer symbol errors, in which case it can be corrected by the decoder. Of course, this repetitive retry process consumes significant amounts of time, thus reducing the rate at which data can be read back from the hard disk drive.

SUMMARY

In general, in one aspect, the invention features a hard disk drive system comprising a hard disk drive comprising a channel; a channel detector adapted to receive a first signal representing a channel sequence from the channel, and to produce a first detected sequence based on the first signal, wherein the first detected sequence comprises a plurality of symbols; a decoder comprising an error-correction decoder adapted to produce first data based on the first detected sequence when a number of symbols in error in the first detected sequence is less than, or equal to, a predetermined number, and to assert a failure indication when the number of symbols in error in the first detected sequence is greater than the predetermined number; and a controller adapted, when the error-correction decoder asserts the failure indication for the first detected sequence, to cause the channel detector to receive a second signal representing the channel sequence from the channel, and to produce a second detected sequence based on the second signal, wherein the second detected sequence comprises a plurality of symbols, and identify corresponding symbols of the first and second detected sequences that differ; wherein the decoder produces second data based on the symbols identified by the controller and at least one of the first and second detected sequences.

Particular implementations can include one or more of the following features. The error-correction decoder is further adapted to produce the second data based on the symbols identified by the controller and at least one of the first and second detected sequences. The controller is further adapted to generate a candidate sequence based on the first and second detected sequences; and the error-correction decoder is further adapted to produce the second data based on the candidate sequence. The controller is further adapted to generate the candidate sequence by replacing k of the identified symbols of one of the first and second detected sequences with k respective corresponding symbols of the other of the first and second detected sequences, wherein k is greater than, or equal to, one. The error-correction decoder is a Reed-Solomon decoder. The channel is selected from the group comprising a magnetic recording channel; and an optical recording channel. Implementations comprise an interface circuit adapted to output the second data.

In general, in one aspect, the invention features an apparatus comprising a channel detector adapted to receive a first signal representing a channel sequence from a channel, and to produce a first detected sequence based on the first signal, wherein the first detected sequence comprises a plurality of symbols; and a decoder comprising an error-correction decoder adapted to produce first data based on the first detected sequence when a number of symbols in error in the first detected sequence is less than, or equal to, a predetermined number, and to assert a failure indication when the number of symbols in error in the first detected sequence is greater than the predetermined number; and a controller adapted, when the error-correction decoder asserts the failure indication for the first detected sequence, to cause the channel detector to receive a second signal representing the channel sequence from the channel, and to produce a second detected sequence based on the second signal, wherein the second detected sequence comprises a plurality of symbols, and identify corresponding symbols of the first and second detected sequences that differ; wherein the decoder produces second data based on the symbols identified by the controller and at least one of the first and second detected sequences.

Particular implementations can include one or more of the following features. The error-correction decoder is further adapted to produce the second data based on the symbols identified by the controller and at least one of the first and second detected sequences. The controller is further adapted to generate a candidate sequence based on the first and second detected sequences; and the error-correction decoder is further adapted to produce the second data based on the candidate sequence. The controller is further adapted to generate the candidate sequence by replacing k of the identified symbols of one of the first and second detected sequences with k respective corresponding symbols of the other of the first and second detected sequences, wherein k is greater than, or equal to, one. The error-correction decoder is a Reed-Solomon decoder. The channel is selected from the group comprising a magnetic recording channel; an optical recording channel; a wired communications channel; a wireless communications channel; and an optical communications channel. Implementations comprise an integrated circuit comprising the apparatus of claim 13.

In general, in one aspect, the invention features a method and computer program comprising receiving a first signal representing a channel sequence from a channel; producing a first detected sequence based on the first signal, wherein the first detected sequence comprises a plurality of symbols; producing first data based on the first detected sequence when a number of symbols in error in the first detected sequence is less than, or equal to, a predetermined number; asserting a failure indication when the number of symbols in error in the first detected sequence is greater than the predetermined number; when the failure indication is asserted for the first detected sequence, receiving a second signal representing the channel sequence from the channel, producing a second detected sequence based on the second signal, wherein the second detected sequence comprises a plurality of symbols, and identifying corresponding symbols of the first and second detected sequences that differ; and producing second data based on the identified symbols and at least one of the first and second detected sequences.

Particular implementations can include one or more of the following features. Producing the second data comprises generating a candidate sequence based on the first and second detected sequences; and producing the second data based on the candidate sequence. Generating the candidate sequence comprises replacing k of the identified symbols of one of the first and second detected sequences with k respective corresponding symbols of the other of the first and second detected sequences, wherein k is greater than, or equal to, one. The channel sequence is encoded using a Reed-Solomon code. The channel is selected from the group comprising a magnetic recording channel; an optical recording channel; a wired communications channel; a wireless communications channel; and an optical communications channel.

The details of one or more implementations are set forth in the accompanying drawings and the description below. Other features will be apparent from the description and drawings, and from the claims.

Figure 1:
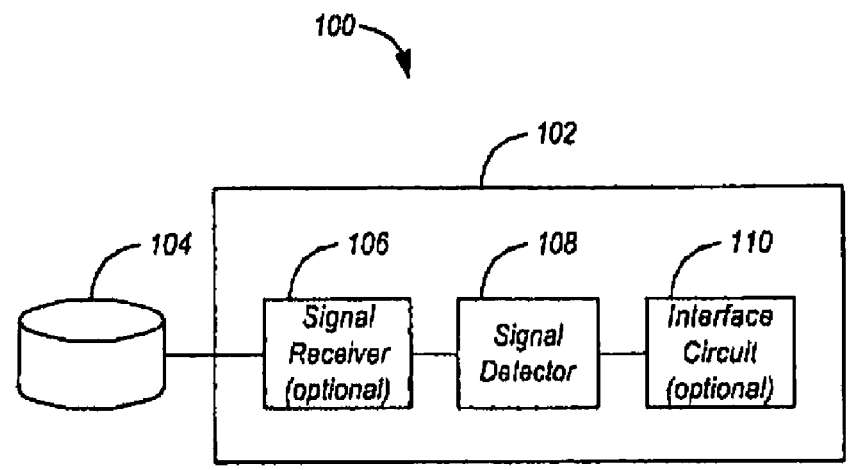
FIG. 1 shows a hard disk drive system that includes a read channel device for processing a read back signal from a hard disk.

The leading digit(s) of each reference numeral used in this specification indicates the number of the drawing in which the reference numeral first appears.

DETAILED DESCRIPTION

While embodiments of the present invention are described with respect to a communication channel in a magnetic hard disk, in other embodiments, the communication channel is in a different type of recording media channel, such as an optical disk, magnetic tape, and so on, a wired, wireless or optical recording channel, and the like.

FIG. 1 shows a hard disk drive system 100 that includes a read channel device 102 for processing a read back signal from a hard disk 104. Read channel device 102 can include an optional signal receiver 106 to receive and condition the read back signal. A signal detector 108 detects and decodes the conditioned read back signal to generate data. An optional interface circuit 110 outputs the data, for example to an input/output bus in a computer system.

Figure 2:
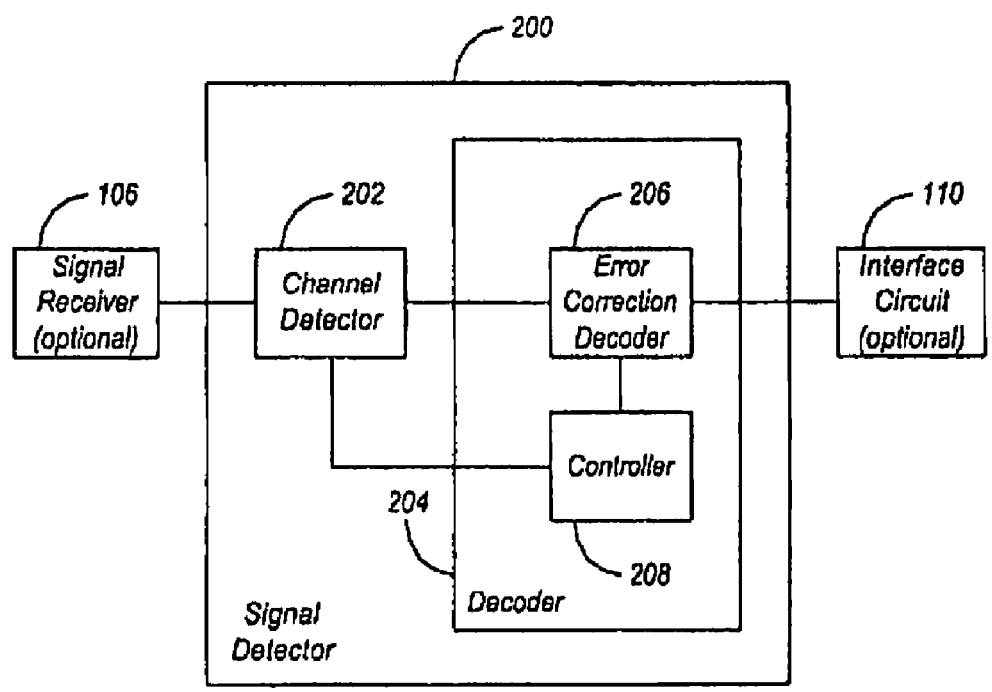
FIG. 2 shows a signal detector that can serve as the signal detector of FIG. 1 according to a preferred embodiment.

FIG. 2 shows a signal detector 200 that can serve as signal detector 108 of FIG. 1 according to a preferred embodiment. Signal detector 200 includes a channel detector 202 and a decoder 204 that includes an error-correction decoder 206 and a controller 208. Channel detector 202 preferably comprises a Viterbi detector, but can instead comprise some other sort of channel detector. Error-correction decoder 206 preferably comprises a Reed-Solomon decoder, but can instead comprise some other sort of error-correction decoder.

Figure 3:
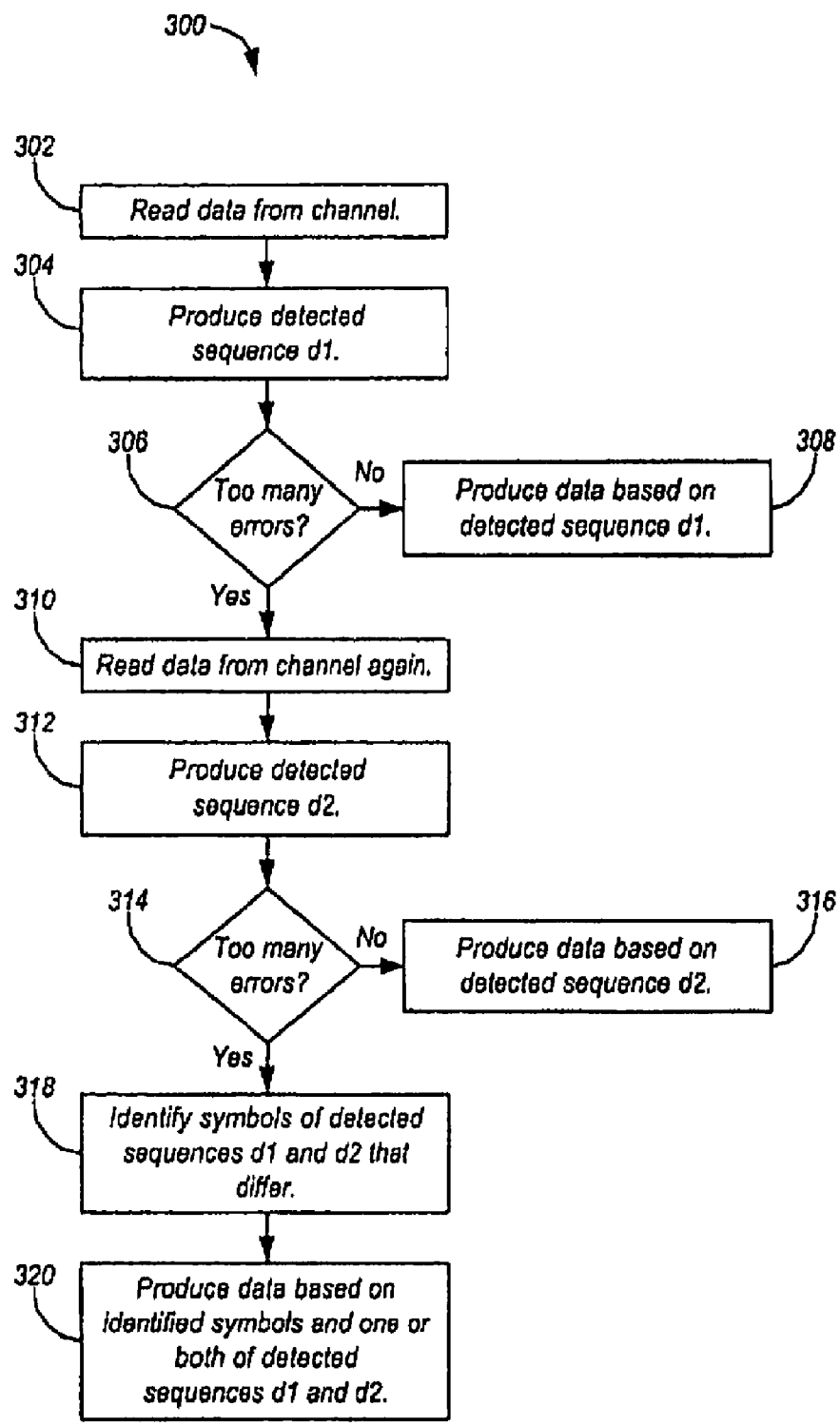
FIG. 3 shows a process that can be executed by the signal detector of FIG. 2 according to a preferred embodiment.

FIG. 3 shows a process 300 that can be executed by signal detector 200 of FIG. 2 according to a preferred embodiment. Channel detector 202 receives a signal s1 representing a channel sequence from a channel (step 302). For example, referring to the hard disk drive system 100 of FIG. 1, read channel device 102 reads data from hard disk 104, and provides signal s1, preferably through optional signal receiver 106, to channel detector 202. Channel detector 202 produces a detected sequence d1 based on signal s1 (step 304), according to well-known techniques such as Viterbi detection.

Figure 4:
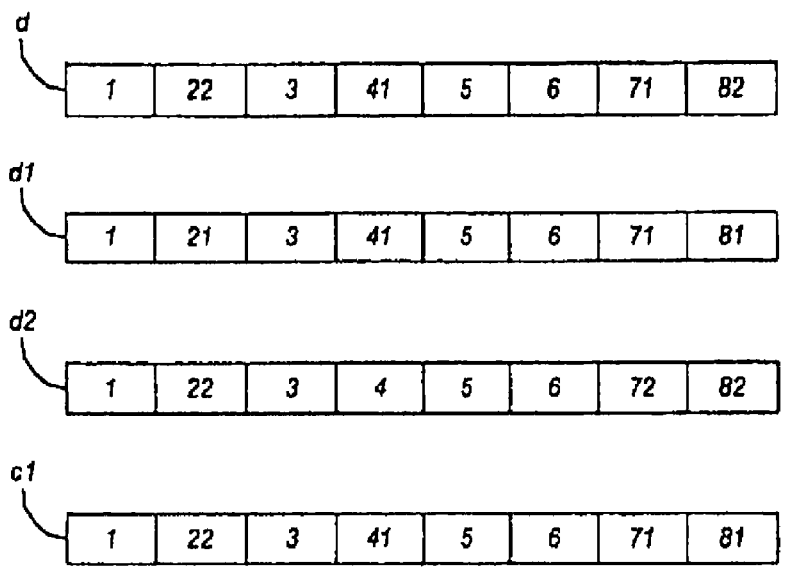
FIG. 4 compares a detected sequence having eight symbols with the correct sequence.

Detected sequence d1 comprises a plurality of symbols, each comprising a plurality of bits. Each symbol may contain errors introduced by noise sources such as the channel, read channel device 102, and the like. FIG. 4 compares a detected sequence d1 having eight symbols with the correct sequence d. Referring to FIG. 4, it is clear that detected sequence d1 contains two errors. The second symbol of detected sequence d1 is 21 while the second symbol of correct sequence d is 22. And the eighth symbol of detected sequence d1 is 81 while the eighth symbol of correct sequence d is 82. Therefore an error-correction decoder 206 with a power of one would be unable to correct detected sequence d1.

Error-correction decoder 206 produces data based on detected sequence d1 when the number of symbols in error in the detected sequence d1 is less than, or equal to, the power of error-correction decoder 206 (steps 306 and 308), and asserts a failure indication when the number of symbols in error in the detected sequence d1 is greater than the power of error-correction decoder 206.

When error-correction decoder 206 asserts the failure indication for detected sequence d1, controller 208 causes channel detector 202 to receive a second signal s2 representing the channel sequence from the channel (steps 306 and 310). For example, referring again to the hard disk drive system 100 of FIG. 1, read channel device 102 reads the data from hard disk 104 a second time, and provides signal s2, preferably through optional signal receiver 106, to channel detector 202. Channel detector 202 produces a detected sequence d2 based on signal s2 (step 312), preferably according to the same technique used to produce detected sequence d1.

Detected sequence d2 comprises a plurality of symbols, each comprising a plurality of bits. Each symbol in detected sequence d2 may contain errors introduced by noise sources such as the channel, read channel device 102, and the like. But because these noise sources vary with time, the symbols of detected sequences d1 and d2 will likely have different errors. Referring again to FIG. 4, it is clear that sequence d2 contains two errors. The fourth symbol of detected sequence d2 is 4 while the fourth symbol of correct sequence d is 41. And the seventh symbol of detected sequence d2 is 72 while the seventh symbol of correct sequence d is 71. Therefore an error-correction decoder 206 with a power of one would be unable to correct detected sequence d2.

Error-correction decoder 206 produces data based on detected sequence d2 when the number of symbols in error in the detected sequence d1 is less than, or equal to, the power of error-correction decoder 206 (steps 314 and 316), and asserts a failure indication when the number of symbols in error in detected sequence d2 is greater than the power of error-correction decoder 206.

When error-correction decoder 206 asserts the failure indication for detected sequence d2, controller 208 identifies corresponding symbols of detected sequences d1 and d2 that differ (step 318). For example, referring to FIG. 4, error-correction decoder 206 identifies the second, fourth, seventh, and eighth symbols because these symbols have different values in detected sequences d1 and d2.

Decoder 204 produces data based on the symbols identified by controller 208 (in step 318) and at least one of detected sequences d1 and d2 (step 320). Of course, if controller 208 asserts the failure indication for this operation, steps 312 through 320 can be repeated to read the data from the channel a third time, produce a third detected sequence d3, and, if necessary, identify corresponding symbols of at least two of the detected sequences d1, d2, and d3 that differ, and produce data based on the identified symbols and at least one of detected sequences d1, d2, and d3. This process can be repeated as many times as necessary.

Some error-correction decoders, such as Reed-Solomon decoders, can improve their performance when symbols suspected of errors are identified to them. In one embodiment, controller 208 passes the identities of the corresponding symbols of detected sequences d1 and d2 that differ (obtained in step 318) to error-correction decoder 206. Error-correction decoder 206 then produces data based on the symbols identified by controller 208 and at least one of detected sequences d1 and d2 according to well-known erasure decoding techniques.

Figure 5:
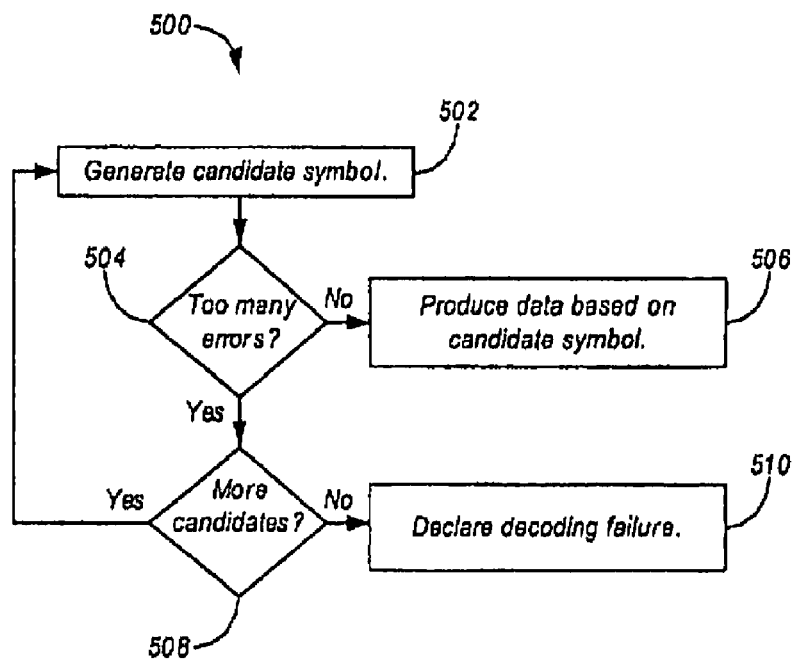
FIG. 5 shows a process that can be executed by the decoder of FIG. 2 according to a preferred embodiment.

In another embodiment, decoder 204 produces data based on the symbols identified by controller 208 (in step 318) and at least one of detected sequences d1 and d2 according to process 500 shown in FIG. 5. Controller 208 generates a candidate sequence based on detected sequences d1 and d2 (step 502). Preferably controller 208 generates the candidate sequence by replacing one or more of the identified symbols (identified in step 318 of FIG. 3) of one of detected sequences d1 and d2 with the respective corresponding symbols of the other of detected sequences d1 and d2. For example, referring to FIG. 4, controller 208 generates a candidate sequence c1 by replacing the second symbol of detected sequence d1 (having a value of 21) with the second symbol of detected sequence d2 (having a value of 22).

Error-correction decoder 206 produces data based on candidate sequence c1 when the number of symbols in error in candidate sequence c1 is less than, or equal to, the power of error-correction decoder 206 (steps 504 and 506), and asserts a failure indication when the number of symbols in error in candidate sequence c1 is greater than the power of error-correction decoder 206.

When error-correction decoder 206 asserts the failure indication for candidate sequence c1, controller 208 generates a different candidate sequence (step 502) using a different combination of the identified symbols (identified in step 318 of FIG. 3). For example, referring again to FIG. 4, controller 208 generates a different candidate sequence by replacing the eighth symbol of detected sequence d1 (having a value of 81) with the eighth symbol of detected sequence d2 (having a value of 82). This process is repeated until error-correction decoder 206 produces data based on the candidate sequence, or until all possible candidate sequences have been tried (step 508), in which case a decoding failure is declared (step 510).

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Please list any additional modifications or variations. Accordingly, other implementations are within the scope of the following claims.

What is claimed is:

1. A system for detecting errors in a channel, the system comprising:
    a signal detector to detect a first sequence from the channel, the first sequence comprising a plurality of symbols;
    a decoder to:
        determine a total number of symbols in error in the first sequence; and
        assert a failure indication when the total number of symbols in error in the first sequence is greater than a predetermined threshold; and
    a controller to cause the signal detector to detect a second sequence from the channel in response to the decoder asserting the failure indication,
    wherein the decoder identifies corresponding symbols in the first sequence and the second detected sequence that differ.

2. The system of claim 1, wherein the first sequence and the second sequence are based on a same channel sequence received from the channel.

3. The system of claim 1, wherein the decoder comprises a Reed-Solomon decoder.

4. The system of claim 1, further comprising the channel.

5. The system of claim 4, wherein the channel comprises a read channel.

6. A device comprising the system of claim 4.

7. The device of claim 6, wherein the device comprises a hard disk drive.

8. A method for detecting errors in a channel, the method comprising:

detecting a first sequence from the channel, the first sequence comprising a plurality of symbols;

determining a total number of symbols in error in the first sequence;

asserting a failure indication when the total number of symbols in error in the first sequence is greater than a predetermined threshold;

responsive to assertion of the failure indication, detecting a second sequence from the channel; and identifying corresponding symbols in the first sequence and the second detected sequence that differ.

9. The method of claim 8, wherein the first sequence and the second sequence are based on a same channel sequence received from the channel.

10. A system for detecting errors in a channel, the system comprising:

a signal detector to detect a first sequence from the channel, the first sequence comprising a plurality of symbols;

a decoder to:

determine a total number of symbols in error in the first sequence; and assert a failure indication when the total number of symbols in error in the first sequence is greater than a predetermined threshold; and a controller to cause the signal detector to detect a second sequence from the channel in response to the decoder asserting the failure indication, wherein the first sequence and the second sequence are based on a same channel sequence received from the channel.

11. The system of claim 10, wherein the decoder identifies corresponding symbols in the first sequence and the second detected sequence that differ.

12. The system of claim 10, wherein the decoder comprises a Reed-Solomon decoder.

13. The system of claim 10, further comprising the channel.

14. The system of claim 13, wherein the channel comprises a read channel.

15. A device comprising the system of claim 13.

16. The device of claim 15, wherein the device comprises a hard disk drive.

* * * * *